(12) United States Patent
Schneider et al.

(10) Patent No.: US 9,489,411 B2
(45) Date of Patent: Nov. 8, 2016

(54) HIGH PERFORMANCE INDEX CREATION

(71) Applicants: Peter Schneider, Dublin, CA (US); Ming-li Rui, Shanghai (CN); Santosh Pendap, Fremont, CA (US); Leon Xiong, Shanghai (CN)

(72) Inventors: Peter Schneider, Dublin, CA (US); Ming-li Rui, Shanghai (CN); Santosh Pendap, Fremont, CA (US); Leon Xiong, Shanghai (CN)

(73) Assignee: Sybase, Inc., Dublin, CA (US)

( * ) Notice: Subject to any disclaimer, the term of this patent is extended or adjusted under 35 U.S.C. 154(b) by 262 days.

(21) Appl. No.: 13/953,341

(22) Filed: Jul. 29, 2013

(65) Prior Publication Data

US 2015/0032758 A1    Jan. 29, 2015

(51) Int. Cl.
*G06F 17/30* (2006.01)

(52) U.S. Cl.
CPC ... *G06F 17/30336* (2013.01); *G06F 17/30321* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,717,919 A * | 2/1998 | Kodavalla | G06F 17/30339 |
| 6,125,370 A * | 9/2000 | Courter et al. | |
| 6,564,221 B1 * | 5/2003 | Shatdal | |
| 6,732,085 B1 * | 5/2004 | Mozes | |
| 8,560,550 B2 * | 10/2013 | Patterson | G06F 17/30616 |
| | | | 707/741 |
| 8,805,796 B1 * | 8/2014 | Hu | G06F 3/0608 |
| | | | 707/692 |
| 2011/0225164 A1 * | 9/2011 | Narasayya et al. | 707/741 |
| 2011/0302583 A1 * | 12/2011 | Abadi et al. | 718/102 |
| 2012/0166419 A1 * | 6/2012 | Enoki | G06F 17/30902 |
| | | | 707/714 |

* cited by examiner

*Primary Examiner* — Rehana Perveen
*Assistant Examiner* — Raheem Hoffler
(74) *Attorney, Agent, or Firm* — Sterne, Kessler, Goldstein & Fox P.L.L.C.

(57) ABSTRACT

High performance index creation using parallel query plans with repartitioning scan and vector-based repartitioning scan is described. An example method includes extracting index key columns from data rows of the database table to build a set of index rows, wherein the index on the database table is defined by a plurality of index key columns including a first index key column and a second index key column. Partition boundary values are generated to divide up the index rows into range-partitioned sets, and the index rows are sorted based on values of the index key columns. A repartitioning scan, including a SARG-based or a vector-based partitioning scan is performed on the index rows, using a plurality of worker threads executing in parallel to build sub-indexes. Subsequently, each range-partitioned set of index rows are assigned to a worker thread in the plurality of worker threads. Accordingly, the sub-indexes generated from the plurality of work threads are merged to build the index for the database table.

18 Claims, 5 Drawing Sheets

HIGH PERFORMANCE INDEX CREATION

BACKGROUND

In a distributed database system, creating appropriate indexes allows the optimizer to speed up queries and find data more efficiently. Index creation operations are frequently complex, time-consuming, and error-prone. Some systems attempt to address these issues by a parallel index creation approach using a producer-consumer mode, where a producer thread scans data rows and passes them to various consumer threads based on a distribution map. However, given the dependency of the consumer threads on the producer thread and dependencies among the consumer threads, such producer-consumer approaches cannot satisfy the requirements of creating index on large tables under certain circumstances, especially when the underlying base table contains hundreds of Giga-bytes of data.

For example, in the event that the base table is compressed, due to the necessity of the producer to decompress and pass the rows to consumer threads, the producer may become bottleneck. Furthermore, the base table, particularly the leading columns in the index key columns, may be near sorted, which leads to uneven distribution where the producer processes rows for a specific consumer, and only one consumer is busy at a specific time. Moreover, the data exchange between the producer and the consumer threads uses limited resources, such as data buffers, which may cause the threads to compete for resources and wait for each other.

The problems are exacerbated by the fact that frequently only one producer is supported for creating indexes in such systems. Therefore, conventional systems fail to provide an ideal parallel index creation mechanism with optimal performance, CPU scaling and availability.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for creating index using parallel query plans with repartitioning scan and vector-based repartitioning. As will be described in further detail below, embodiments can generate and compile a parallel query plan, including a upper sub-plan and a lower sub-plan, to create the index. Embodiments can further provide that the upper sub-plan is executed by a coordinator thread and the lower sub-plan is executed by as many worker threads as required, thereby redistributing workload of the producer to multiple worker threads and avoiding the producer from being a bottleneck. Embodiments can perform a Search Argument (SARG) based repartitioning scan or a vector-based repartitioning on the index rows of the database table and assign each index row partition to a worker thread to build a sub-index. Accordingly, embodiments eliminate the dependency of consumers on the producer and the dependencies among consumers.

System

Figure 1:
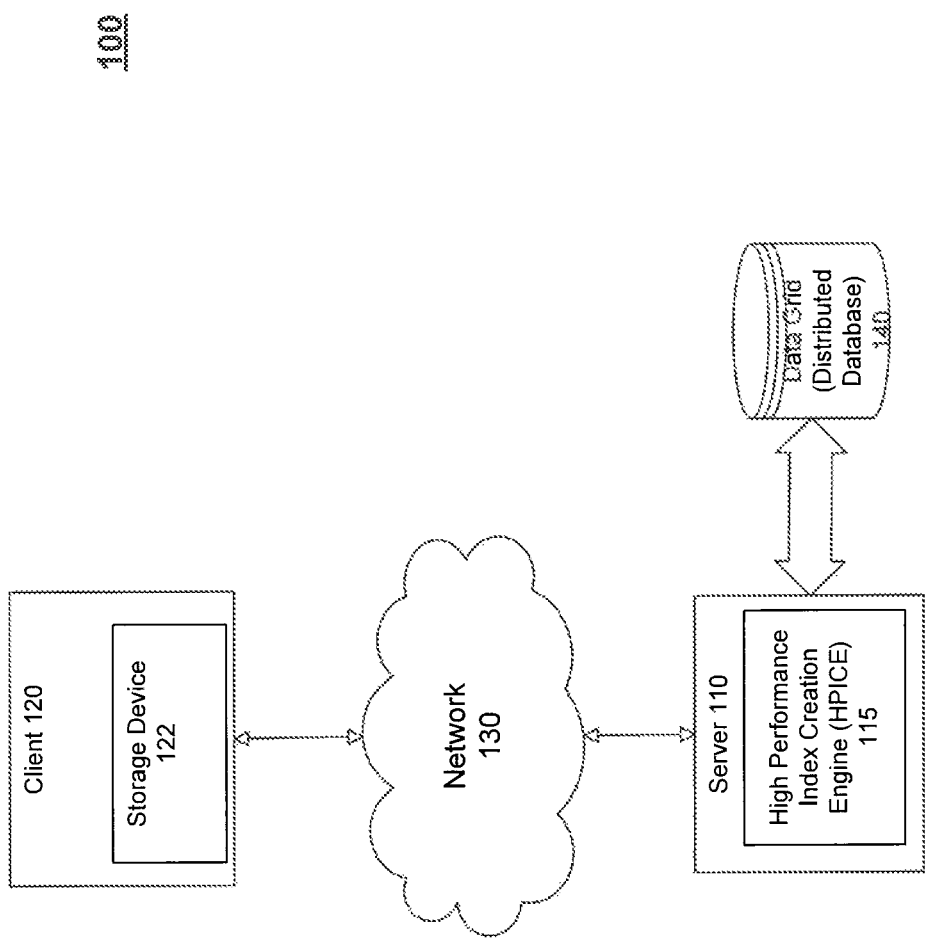
FIG. 1 illustrates a client/server system, according to an embodiment.

FIG. 1 illustrates a client/server system 100. System 100 includes a server 110, a High Performance Index Creation Engine (HPICE) 115, a client 120, a network 130, and a data grid or distributed database 140.

Client 120 communicates with server 110 over the network 130. Specifically, client 120 may be connected to a Database Management System (DBMS) (not shown) on server 110 via network 130. In an embodiment, the DBMS includes Sybase® Adaptive Server® Enterprise (ASE) (available from Sybase, Inc. of Dublin, Calif.) and operates as an independent process (i.e., independently of the clients), running under a server operating system such as Microsoft® Windows NT, Windows 2000. Windows XP, Windows Vista and Windows 7 (all from Microsoft Corporation of Redmond, Wash.), UNIX (Novell), Solaris (Sun), or Linux (Red Hat). The client 120 includes functionality for packaging client calls in the well-known Structured Query Language (SQL) together with any parameter information into a format (of one or more packets) suitable for transmission to the DBMS. Client 120 may send SQL statement to server 110 and receive query result from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Client 120 includes a storage device 122. Although only one client 120 is shown, more clients may be used as necessary. Storage device 122, an example of which will be described in detail with respect to FIG. 5, can be any device for recording and storing information, which includes but is not limited to, flash memory, magnetic tape and optical discs.

Server 110 can host High Performance Index Creation Engine (HPICE) 115. As illustrated in FIG. 1, client 120 can send data requests to server 110, which can in turn invoke HPICE 115 for further processing. HPICE 115 can be software, firmware, or hardware or any combination thereof in a computing device. System 100 can be implemented on or implemented by one or more computing devices. As will be further described with respect to FIG. 5, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
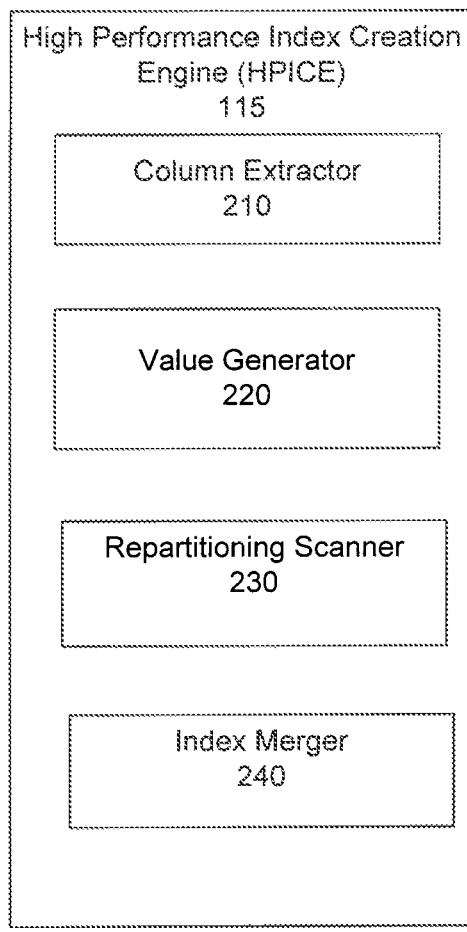
FIG. 2 illustrates elements of a High Performance Index Creation Engine (HPICE), according to an embodiment.

FIG. 2 illustrates elements of a High Performance Index Creation Engine (HPICE), according to an embodiment. In the example shown in FIG. 2, HPICE 115 includes column extractor 210, value generator 220, repartitioning scanner 230, and index merger 240.

Column extractor 210 extracts index key columns from data rows of a database table to build a set of index rows. In one embodiment, the index on the database table to be built is defined by a plurality of index key columns. Index rows, including the index key columns, may be built and sorted based on its key order. Accordingly, page buffers full of entire, decompressed data rows may be passed to the sorting code. For example, column extractor 210 may inspect a CREATE INDEX statement and identify the index key columns that are necessary to create the index. Column extractor 210 may subsequently build a set of index rows by extracting the relevant index key columns and row ID (RID) from the underlying table. Using the smaller index rows instead of entire data rows of the base table as input to the sorting code may allow many more rows to be stored on each page buffer, and thus improve the performance of CREATE INDEX execution. In another embodiment, to ensure the advantage of the reduced size of the index rows, some systems may use the index rows as input for further sorting operations under certain conditions, such as when the index rows are less than ⅓ the size of the data rows.

Value generator 220 generates partition boundary values to divide up the index rows into range-partitioned sets, and the index rows are sorted based on values of the index key columns. According to one embodiment, value generator 220 generates partition boundary values based on the first index key column of the index rows. According to another embodiment, value generator 220 generates partition boundary values based on the first index key column, and the second index key column of the index rows. According to still another embodiment, value generator 220 generates partition boundary values based on multiple index key columns, including the first index key column and the second index column.

In an embodiment, to increase performance for processing queries, a database management system, such as DBMS on server 110, may partition database tables. Partitioning database tables is a technique where a DBMS divides large tables into partitions or smaller segments using a deterministic partitioning function that partitions a table T into P partitions, where f(col1, col2, . . . colM)=k, for a given row R(col1, col2, . . . , colN) such that M<=N and 0<=k<=(P−1). As a result, the query executes faster because optimizer may access data corresponding to the database table partition, rather than data corresponding to the entire database table. There are numerous ways to partition data in database tables. For example, a non-exhaustive, non-limiting list includes range partitioning and hash partitioning.

In range partitionings, the database table is partitioned based on a range of values. The range of values are attributes in one or more columns in the database table. In an example embodiment, a column "Age" in the database table contains data pertaining to a person's age. The column may be partitioned into three partitions, where each database table partition includes a range for a specific age, such as, but not limited to, partition I containing children ages 1-18, partition II containing adults ages 19-64, and partition III containing adults ages 65 and over.

In hash partitionings, the DBMS distributes data to database table partitions based on the outcome of the hash function. A hash function is applied on the data in a particular column in the database table. In an example embodiment, column "Age" may be partitioned into three partitions by applying the hash function to each attribute in the column. A hash function generates a result which identifies the database table partition that contains the attribute. For example, in a non-limiting example, the hash function may generate a result=0 for partition I, result=1 for partition II, and result=2 for partition III. A person skilled in the art would appreciate and understand how to partition data in database tables using range partitioning and hash partitioning, as well as by using other techniques.

Repartitioning scanner 230 performs a repartitioning scan on the index rows of the database table. Based on the repartitioning scan, each range-partitioned set of index rows are assigned to a worker thread and a plurality of worker threads are executed in parallel to build the sub-indexes.

In the example illustrated below, in the event that the first index key column contains quite a few distinct values for the base table t1, a Search Argument (SARG) based repartitioning scan may be used to determine the assignment of the worker threads to the partitions.

TABLE: create table t1 (c1 int, c2 int, c3 varchar(30)) lock datarows

DATA: (Insert into t1 900 rows with values of c1 from 1 to 900, c2=c1*10)

Index: create index i1 on t1(c1, c2) with consumers=3

The distribution map may contain two partition boundaries for 3 partitions. For example:

Partition Element: 1: (215, 2150)
Partition Element: 2 (430, 4300)

The Partition Elements may contain boundary values for both index key columns c1 and c2, but only the values for c1 are used to generate the SARGs for the repartitioning operations. A search argument (SARG) limits a search because it specifies an exact match, a range of values, or a conjunction of two or more items joined by AND. The following table shows the corresponding SARGs and how they may be mapped to three worker threads that are executing the repartitioning operations:

| Worker thread ID | Repartitioning SARGs |
| --- | --- |
| 0 | c1 <= 215 |
| 1 | 215 < c1 <= 430 |
| 2 | c1 > 430 |

Accordingly, worker thread 0 is assigned to the partition where c1<=215; worker thread 1 is assigned to the partition where 215<c1<=430; and worker thread 2 is assigned to the partition where c1>430. Each worker thread may be executed to generate a sub-index for its corresponding partition.

Index merger 240 merges the sub-indexes from the plurality of work threads to generate the index for the database table. In one embodiment, after the worker threads have finished executing, index merger 250 may gathers their results and drives the building of the index from the sub-indexes. Index merger 250 may further accumulate the statistics generated by the worker threads.

Embodiments of the elements of HPICE. 115 FIG. 2, as described herein, may be further configured to run in parallel. Such parallel execution of these elements would increase the efficiency and speed of HPICE 115.

Method

Figure 3:
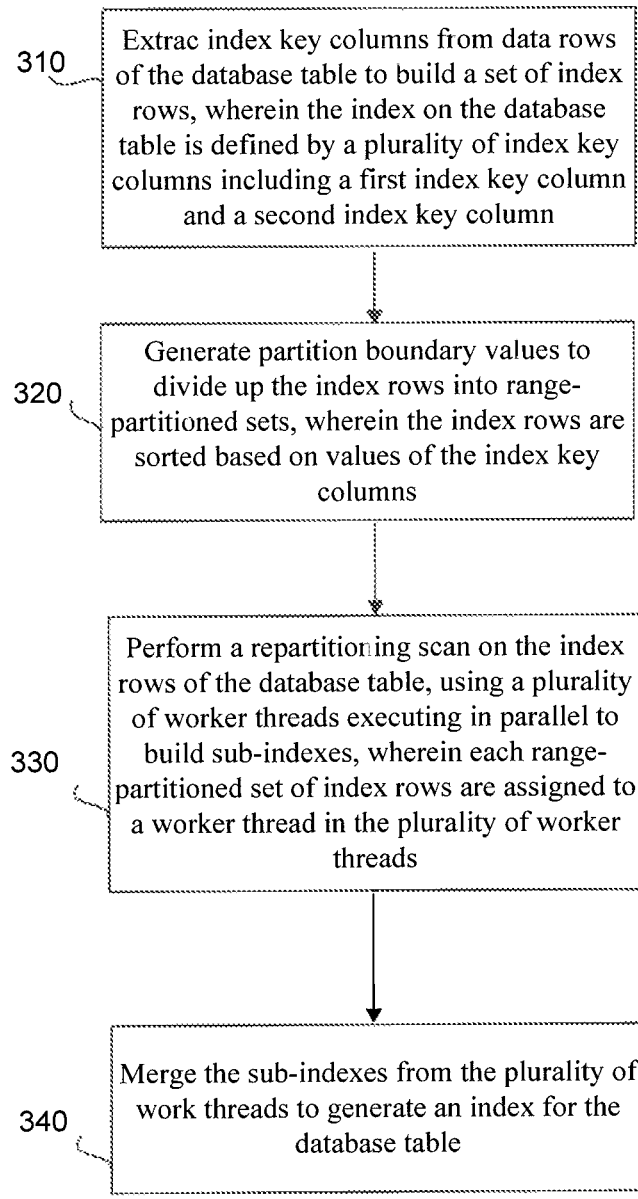
FIG. 3 is a flowchart for a method for creating index using parallel query plans with repartitioning scan and vector-based repartitioning, according to an embodiment.

FIG. 3 is a flowchart for a method for creating index using parallel query plans with repartitioning scan and vector-based repartitioning, according to an embodiment. In an embodiment, method 300 is performed by a server. For ease of explanation, method 300 will be described with respect to HPICE 115 of FIG. 2, which is in server 110, as described above. However, method 300 is not intended to be limited thereto.

At stage 310, index key columns that define an index on a database table are extracted to build a set of index rows. For example, column extractor 210 may extract the index key columns to build the index rows. Data rows in the base table may be sampled to determine if the database table is qualified for parallel processing. For example, the base table is sampled if it is partitioned. If there are two or more partitions, the base table may be subject to parallel processing. Further, the CREATE INDEX statement may be checked before submit it for parallel processing. For example, the current CREATE INDEX SQL statement may be checked to exclude the situation that it is caused by an internal call to re-build indexes.

At stage 320, partition boundary values are generated to divide up the index rows into range-partitioned sets, and the index rows are sorted based on values of the index key columns. For example, value generator 220 may generate the partition boundary values to divide up the index rows into different partitions. As discussed above, partition boundary values may be generated based on the first index key column of the index rows or additional index key columns defined by the CREATE INDEX statement. According to some embodiments, the index, rows may be hash-partitioned or partitioned by other mechanisms.

At stage 330, a repartitioning scan is performed on the index rows of the database table and assign each partition of index rows to a worker thread, where a plurality of worker threads are executed in parallel to build sub-indexes. For example, repartitioning scanner 230 may perform the repartitioning scan on the index rows to assign the partitions to the worker threads.

In the example illustrated below, if the first index key column does not have adequate number of distinct values, a vector-based repartitioning may be used in lieu of the SARG-based repartitioning scan to determine the assignment of the worker threads to the partitions.

TABLE: create table t1 (c1 int, c2 int, c3 varchar(30)) lock datarows

DATA: (Insert into t1 900 rows with values of c1 from 1 to 900, c2=c1*10)

update t1 set c1=500 where c1>1 and c1<900
    update t1 set c2=9999 where c1=1
    update t1 set c2=-9999 where c1=900
    Index: create index i1 on t1(c1, c2) with consumers=3

The distribution map may contain two elements for 3 partitions. For example:

Partition Element: 1: (p1.c1, p1.c2)=(500, 2150)
    Partition Element: 2: (p2.c1, p2.c2)=(500, 4300)

In this example, Partition Elements contain boundary values for both index key columns c1 and c2. Thus, a vector comparison of a row with the values of c1 and c2 may decide whether the row is mapped to a corresponding work thread.

Vector-based repartitioning scan may determine repartition rows based on columns vector (c1, c2) instead of a SARGS approach. Accordingly, the following vector comparison operations are performed to process the index rows:

For work thread 0, process index rows: (c1, c2)<=(p1.c1, p1.c2) (500, 2150):
    a) If c1<p1.c1 (500), skip check c2, this row is mapped to this thread;
    b) if c1==p1.c1 (500), check c2<=p1.c2(2150), if true, map the index row to this thread.

For work thread 1, process index rows: (p1.c1, p1.c2) (500, 2150)<(c1,c2)<=(p2.c1, p2.c2)(500, 4300):

a) when p1.c1==p2.c1, if (c1==p1.c1) is false, do not map the index row to this thread: if true, check p1.c2<c2<=p2.c2;
    b) when p1.c1<p2.c1,
        i) if ((c1<p1.c1)||(c1>p2.c1)), do not map the index row to this thread;
        ii) if (c1==p1.c1), check c2>p1.c2, if true, map the index row to this thread, otherwise do not map to this thread;
        iii) if (c1==p2.c1), check c2<=p2.c2, if true, map the index row to this thread, otherwise do not map to this thread;
        iv) if (p1.c1<c1<p2.c1), map to this thread.

For work thread 2, process index rows: (c1, c2)>(p2.c1, p2.c2) (500, 4300):
    a) if c1>p2.c1 (500, skip check c2, map the index row to this thread;
    b) if c1=p2.c1 (500), check c2>p2.c2(2150), if true, map to this thread.

At stage 340, the sub-indexes generated from the plurality of work threads are merged to generate the index for the database table. For example, index merger 240 may merge the sub-indexes generated from the worker threads to build the index for the database table.

Figure 4:
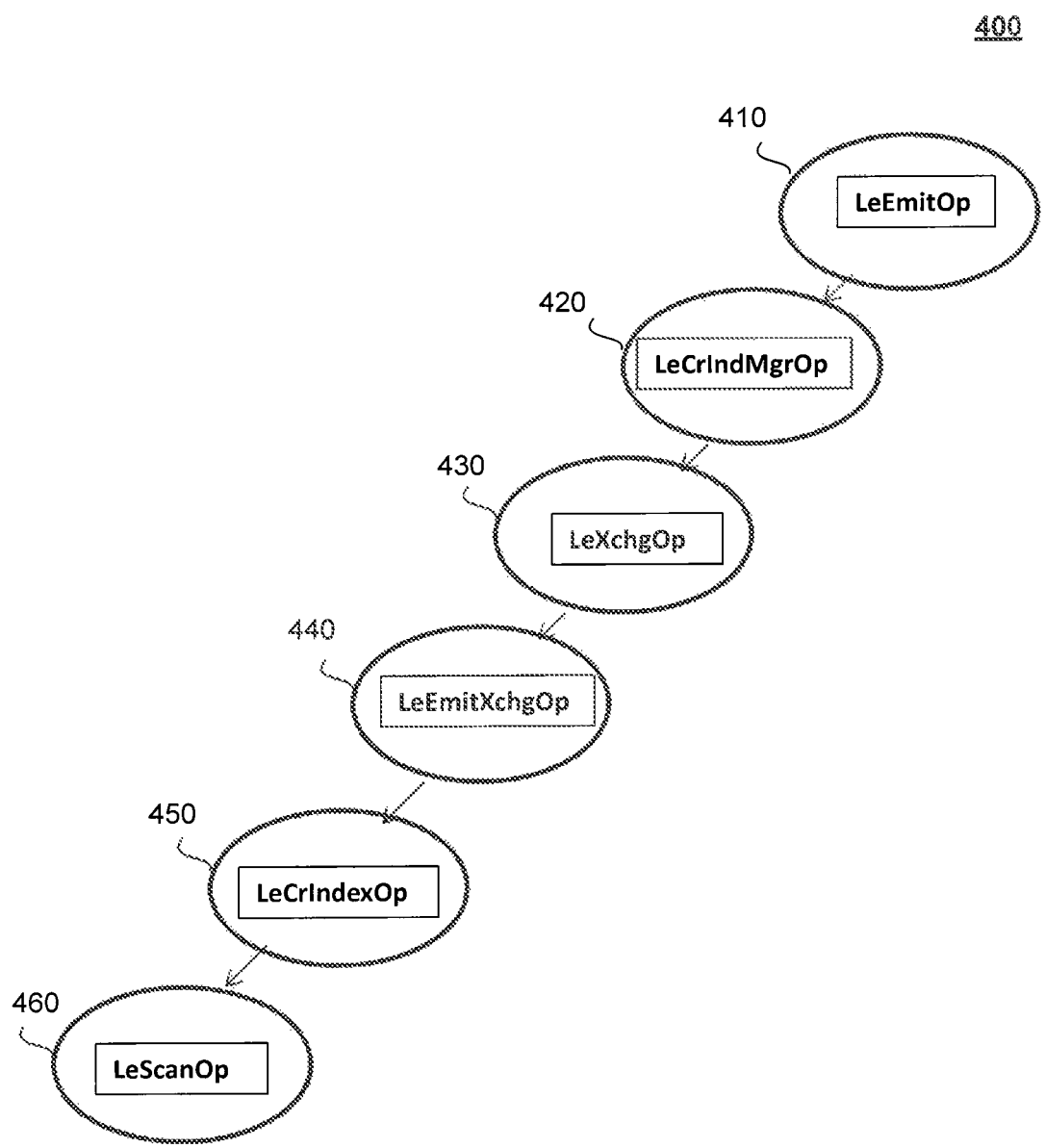
FIG. 4 depicts example operators implementing a parallel execution plan, according to an embodiment.

FIG. 4 depicts example operators implementing a parallel execution plan, according to an embodiment. In the example parallel execution plan illustrated in FIG. 4, the operators implementing the execution plan includes LeEmitOp 410, LeCrIndMgrOp 420, LeXchgOp 430, LeEmitXchgOp 440, LeCrIndexOp 450 and LeScanOp 460. A person of ordinary skill in the art would understand that the names of the operators are provided for purposes of illustration, not limitation. Other names of the operators may be used to implement the parallel execution plan.

According to an embodiment, the parallel execution plan contains an upper sub-plan and a lower sub-plan, with LeXchgOp 430 being the leaf operator of the upper plan fragment (sub-plan) and the LeEmitXchgOp 440 being the top operator in the lower plan fragment (sub-plan). The upper sub-plan may be executed by an alpha or coordinator thread, while the lower sub-plan may be executed by a plurality of worker threads.

The coordinator thread executes the upper sub-plan that starts at LeEmitOp 410, which may in turn drive the execution of the entire parallel execution plan. LeEmitOp 410 may process the resultant rows and route to client applications.

LeCrIndMgrOp 420 may prepare the worker threads which would build their sub-indexes using LeCrIndexOp 450 before the worker threads start executing. Furthermore, after the worker threads have finished executing, LeCrIndMgrOp 420 may gather their results and drive the merging of the index from the sub-indexes created by the worker threads as well as the final accumulation of the statistics generated by the worker threads.

LeXchgOp 430 is the leaf operator of the upper sub-plan, which is executed by the coordinator thread. LeXchgOp 430 may drive the parallel processing process, set buffer pipes to read results from the worker threads.

The lower sub-plan starts at LeEmitXchgOp 440, which drives the execution of the plan below it and passes the resultant rows and meta data back to LeXchgOp 430.

LeCrIndexOp 450 drives the process of building sub-indexes on the partition of rows it receives from its LeScanOp 460.

LeScanOp 460 may implement SARG-based or vector-based repartitioning scan in creating the index. In an embodiment, only the values of the first column of a multi-column index are used to determine the partition boundaries. For example, in an embodiment, LeScanOp 460 performs a SARG-based repartitioning scan upon determination that there are no duplicated values in the partition boundary values of the first index key column. If duplicate key values are found for the first column in any two of the boundary rows, single-SARG repartitioning may not be used to partition the index rows and a Boolean may be set to FALSE to record this fact.

Alternatively, LeScanOp 460 performs a SARG-based repartitioning scan upon determination that the duplicated values in the partition boundary values of the first index key column are below a predefined threshold.

In another embodiment, LeScanOp 460 implement vector comparisons that SARGs on multiple columns may be used as a repartitioning condition. For example, LeScanOp 460 performs a vector-based repartitioning scan upon determination that there are duplicated values in the partition boundary values of the first index key column.

According to an embodiment, LeScanOp 460 is a range-repartitioning operator. All of the worker threads may execute LeScanOp 460 and may scan the entire table. Further, each worker thread may apply its own set of SARGs that are built using the distribution map's partition boundary values to qualify a subset of the index rows of the table to process.

Notably, repartitioning LeScanOp 460 is different from a merely parallel LeScanOp, where the query plan would require an additional LeXchgOp 430 between the LeScanOp 460 and the LeCrIndexOp 450 to partition the table's index rows by range and distribute the rows among the worker threads that would execute LeCrIndexOp 450. In a parallel LeScanOp, the extra LeXchgOp 430 may require writing all of the data rows of the table into pipe buffers and passing them across pipes from the worker threads that are reading the table (producers) to the worker threads (consumers) that are sorting the rows and creating the sub-indexes.

In contrast, in repartitioning LeScanOp 460, the same thread that reads a partition of data rows may also execute LeCrIndexOp 450 to sort them and build the sub-index on that partition, thus avoiding writing data rows to pipe buffers and passing them between the producer and consumer threads, as described above. Accordingly, each worker thread will scan the whole table and only process qualified rows, which results in better CPU scaling. Repartitioning LeScanOp 460 may further remove the dependency of consumers on a single producer and the dependencies among the consumers. Finally, repartitioning LeScanOp 460 may redistribute the workload of the producer to multiple worker threads, thus avoiding the producer from becoming a bottleneck.

Example Computer System Implementation

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
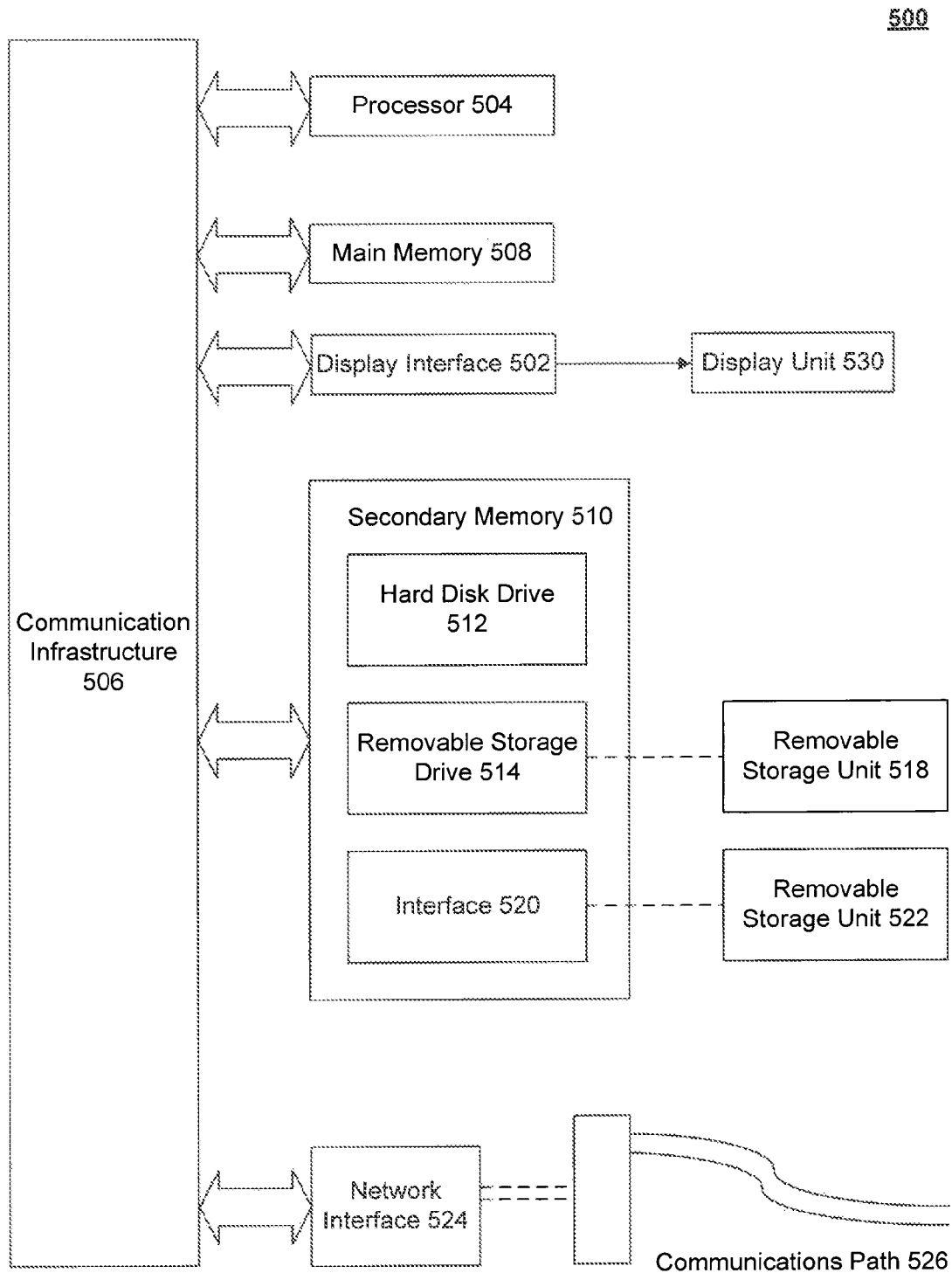
FIG. 5 is a diagram of an example computer system in which embodiments can be implemented.

FIG. 5 illustrates an example computer system 500 in which embodiments, or portions thereof, may be implemented as computer-readable code. For example, HPICE 115, including its components, as shown in FIG. 2, can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a network interface 524. Network interface 524 allows software and data to be transferred between computer system 500 and external devices. Network interface 524 may include a modem, a network interface (such as an Ethernet card), a communications port, a PCMCIA slot and card, or the like. Software and data transferred via network interface 524 may be in the form of signals, which may be electronic, electromagnetic, optical, or other signals capable of being received by network interface 524. These signals may be provided to network interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via network interface 524. Such computer programs, when executed, enable computer system 500 to implement embodiments as discussed herein. In particular, the computer programs, when executed, enable processor device 504 to implement the processes of embodiments of the present invention, such as the stages in the methods illustrated by flowchart 300 of FIG. 3, discussed above. Accordingly, such computer programs represent controllers of the computer system 500. Where embodiments are implemented using software, the software may be stored in a computer program product and loaded into computer system 500 using removable storage drive 514, interface 520, and hard disk drive 512, or network interface 524.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for creating an index on a database table, comprising:
    building a set of index rows by extracting an index key column from data rows of the database table;
    sorting the set of index rows based on the values of the index key column;
    generating partition boundary values to divide up the index rows into range-partitioned sets;
    performing a search argument-based repartitioning scan on the index rows of the database table upon determination that there are no duplicated values in the partition boundary values of the index key column;
    assigning each range-partitioned set of index rows to one of a plurality worker threads in the plurality of worker threads;
    executing at least some of the worker threads in parallel to build a plurality of sub-indexes based on the range-partitioned sets; and
    merging the plurality sub-indexes from the plurality of work threads to generate the index for the database table.

2. The method of claim 1, further comprising performing a vector based repartitioning scan performed upon determination that there are duplicated values in the partition boundary values of the index key column.

3. The method of claim 2, wherein the vector-based repartitioning scan is associated with a repartition of the index rows based on a columns vector built upon partition boundary values of at least the index key column.

4. The method of claim 1, wherein the search argument-based repartitioning scan is associated with a repartition of the index rows based on partition boundary values of the first index key column only.

5. The method of claim 1, further comprising sampling data rows in the database table to determine if the database table is qualified for parallel processing.

6. The method of claim 1, further comprising performing a vector based repartitioning scan performed upon determination that duplicated values in the partition boundary values of the index key column exceed a predefined threshold.

7. The method of claim 1, further comprising sampling data rows in the database table to generate a distribution map including partition boundary rows, which are defined by the partition boundary values of the index key column.

8. The method of claim 7, further comprising performing a vector-based repartitioning scan that includes a vector comparison of an index row to be processed with the partition boundary rows.

9. A system for creating an index on a database table, comprising:
a column extractor, implemented by one or more computing devices, configured to:
extract an index key column from data rows of the database table, and
sort the set of index rows based on the values of the index key column;
a value generator, implemented by one or more computing devices, configured to:
generate partition boundary values to divide up the index rows into range-partitioned sets;
a repartitioning scanner, implemented by one or more computing devices, configured to:
perform a search argument-based repartitioning scan on the index rows of the database table upon determination that there are no duplicated values in the partition boundary values of the index key column,
assign each range-partitioned set of index rows to one of a plurality of worker threads in the plurality of worker threads, and
execute at least some of the worker threads in parallel to build a plurality of sub-indexes based on the range-partitioned sets; and
an index merger, implemented by one or more computing devices, configured to merge the plurality of sub-indexes from the plurality of work threads to generate the index for the database table.

10. The system of claim 9, wherein the repartitioning scanner is further configured to perform a vector-based repartitioning scan upon determination that there are duplicated values in the partition boundary values of the index key column.

11. The system of claim 10, wherein the vector-based repartitioning scan is associated with a repartition of the index rows based on a columns vector built upon partition boundary values of at least the index key column.

12. The system of claim 9, wherein the search argument-based repartitioning scan is associated with a repartition of the index rows based on partition boundary values of the first index key column only.

13. The system of claim 9, further comprising: a data sampler, implemented by one or more computing devices, configured to sample data rows in the database table to determine if the database table is qualified for parallel processing.

14. The method of claim 9, wherein the repartitioning scanner is further configured to perform a vector-based repartitioning scan upon determination that duplicated values in the partition boundary values of the index key column exceed a predefined threshold.

15. The method of claim 9, further comprising sampling data rows in the database table to generate a distribution map including partition boundary rows, which are defined by the partition boundary values of the index key column.

16. The method of claim 15, wherein the vector-based repartitioning scan includes a vector comparison of an index row to be processed with the partition boundary rows.

17. A computer program product comprising a computer readable storage medium having instructions encoded thereon that, when executed by a processor, cause the processor to perform operations comprising:
building a set of index rows by extracting an index key column from data rows of the database table;
sorting the set of index rows based on the values of the index key column;
generating partition boundary values to divide up the index rows into range-partitioned sets;
performing a search argument-based repartitioning scan on the index rows of the database table upon determination that there are no duplicated values in the partition boundary values of the index key column;
assigning each range-partitioned set of index rows are assigned to one of a plurality worker threads in the plurality of worker threads;
executing at least some of the worker threads in parallel to build a plurality of sub-indexes based on the range-partitioned sets; and
merging the plurality of sub-indexes from the plurality of work threads to generate the index for the database table.

18. A computer-implemented method for creating an index on a database table, comprising:
building a set of index rows by extracting an index key column from data rows of the database table;
generating partition boundary values to divide up the index rows into range-partitioned sets;
sorting the index rows based on values in the index key column;
determining that there are no duplicated values in the partition boundary values of the index key column;
performing a search argument based repartitioning scan on the index rows of the database table using a plurality of worker threads executing in parallel to build sub-indexes wherein each range-partitioned set of index rows are assigned to a worker thread in the plurality of worker threads, wherein the a search argument-based repartitioning scan is performed upon determination that there are no duplicated values in the partition boundary values of the first index key column; and
merging the sub-indexes from the plurality of work threads to generate the index for the database table.

* * * * *